US005490207A

United States Patent [19]

Schorr

[11] Patent Number: 5,490,207

[45] Date of Patent: Feb. 6, 1996

[54] METHOD OF DISPERSING INFORMATION AND COLLECTING DATA VIA TELEPHONE SYSTEMS

[76] Inventor: Andrew Schorr, 9220 SE. 68th St., Mercer Island, Wash. 98040-5135

[21] Appl. No.: 184,680

[22] Filed: Jan. 21, 1994

[51] Int. Cl.[6] .......... H04M 11/00

[52] U.S. Cl. .......... 379/92; 379/202

[58] Field of Search .......... 379/92, 94, 95, 379/90, 202–205, 188, 196–199, 111, 119, 126, 131, 135, 140

[56] References Cited

U.S. PATENT DOCUMENTS

| | | | |
|---|---|---|---|
| 4,611,095 | 9/1986 | LeBlanc et al. | 379/203 |
| 4,785,472 | 11/1988 | Shapiro | 379/96 |
| 4,845,739 | 7/1989 | Katz | 379/92 |
| 4,908,850 | 3/1990 | Masson et al. | 379/88 |
| 4,937,856 | 6/1990 | Natarajan | 379/205 |
| 4,939,773 | 7/1990 | Katz | 379/204 |
| 4,974,252 | 11/1990 | Osborne | 379/92 |
| 4,974,253 | 11/1990 | Hashimoto | 379/100 |
| 5,060,256 | 10/1991 | Borbas et al. | 379/92 |
| 5,153,579 | 10/1992 | Fisch et al. | 340/825.22 |
| 5,208,850 | 5/1993 | Kino | 379/88 |
| 5,224,153 | 6/1993 | Katz | 379/93 |
| 5,363,433 | 11/1994 | Isono | 379/92 |
| 5,369,693 | 11/1994 | Pillet et al. | 379/203 |

FOREIGN PATENT DOCUMENTS

| | | | |
|---|---|---|---|
| 4-314247 | 11/1992 | Japan | 379/188 |
| 8002095 | 10/1980 | WIPO | 379/92 |

*Primary Examiner*—Wing F. Chan

*Attorney, Agent, or Firm*—Paul L. Griffiths

[57] ABSTRACT

An interactive telecommunications system comprising a telephone network, a conference bridge and a live studio talk-show style program. This system is well suited for disseminating specific information to a highly targeted group. The listeners are prevented from being able to talk during the program unless they first propose a question to a producer, this being a separate connection from the program. If the producer determines the question has merit, the listener is connected to the program announcer/speakers and two-way communication begins, with all in the target group able to hear the question. Once the question is presented, or answered, the listener returns to one-way voice communication.

5 Claims, 2 Drawing Sheets

METHOD OF DISPERSING INFORMATION AND COLLECTING DATA VIA TELEPHONE SYSTEMS

TECHNICAL FIELD

This invention relates to communication systems, and more particularly, to an interactive telecommunication system providing live talk show style programming directed toward a highly targeted group of listeners who cannot interrupt the program without the approval of an intermediate person, such as a producer, but can request information in many forms.

BACKGROUND INFORMATION

The capabilities of telecommunications systems have expanded rapidly in the last ten years. One such capability is that of connecting more than two people, in more than two locations, via telephone, enabling the parties to have a conference call via their telephones. A conference call can now connect many people together on the same conference call. The ability has been developed for a large number of listeners to dial one of two telephone numbers in order that they may vote, so to speak, for a poll based on a question given over a broadcast show (television or radio). In the former situation, all of the parties are capable of talking at one time, thereby breaking down the communication as the other parties will not be able to understand either of the two parties when they are speaking at the same time, similar to two way radio, or VHF, communications. In the latter situation, the party calling to have their vote counted cannot ask a question at their request.

Many companies, whether large or small, are desirous of a method of communicating specific information to either a specific group, such as their sales representatives, customers, or to their employees. In order to have such a large conference a company may sometimes have to either hold the meeting outdoors or rent a sufficiently large auditorium. Another problem is the time lost by each employee going to or coming from the conference and, in the case of attendees traveling long distances, the attendant costs involved. There may be also information that the company wants to disseminate to the employees, however it is for the employees benefit, hence it is to be done on the employees' own time. In this same manner, educational programs can be offered without the need to bring all or any of the students to one place. These and other problems are addressed by the present invention.

Talk shows, whether television or radio, have become extremely popular. A format where members of the audience may telephone in and ask a question during the live portion of a show, especially radio, is quite popular. The present invention combines selected elements of a talk show format with selected elements of a conference call. This enables a program sponsor, whether it be a corporation or any other entity, to arrange for a live radio-style show to be tailored to the information they want to disseminate to a target group of listeners.

Another problem faced by program sponsors is finding out who is listening to their program. This is valuable information for defining the target group's particular characteristics. The present invention allows program sponsors to easily collect a significant amount of information about its listeners.

An example may be a company with a new product that wants to disseminate information regarding that product to its various sales reps, without having all of them come to a specific location or repeat the information over and over to each one of them. Each of the sales representatives would be given a telephone number (usually an 800 number) and a time to call. For security, a security check can be performed when answering the incoming call. One such method would include requesting the listener to enter a security number (personal identification number, or PIN). After proper identification is given, the listener would be connected directly to the live program.

SUMMARY OF THE INVENTION

The invention is a selectively interactive communication system that is particularly well suited for disseminating information to a targeted group of listeners. The system allows a conference telephone call whereby a broadcast style talk show is presented to listeners and the listeners must make a specific request in order to ask a question "on the air." Hence, the majority of the conference call is one-way communication, although two-way communication is possible, at the control and direction of a program director.

The system comprises three essential elements, a listener's telephone, a live broadcast studio, and a conference bridge connecting the two. The bridge controls the interactive communication between the individual telephones and the studio. The bridge allows one listener at a time to talk to a producer who decides if a listener's comment or question is pertinent and if so allows that particular listener to have two-way voice communication with the studio, while all other listeners remain on a one-way connection.

Listeners can request information by entering predetermined number codes on their individual telephones. A listener can receive the requested information in many different ways. A fax can be sent to the listener, a letter can be mailed, or, if appropriate, the listener can be connected to an operator.

BRIEF DESCRIPTION OF THE DRAWINGS

In the drawings, like reference numerals and characters refer to like parts throughout the various diagrams, and wherein.

BEST MODE FOR CARRYING OUT THE INVENTION

Figure 1:
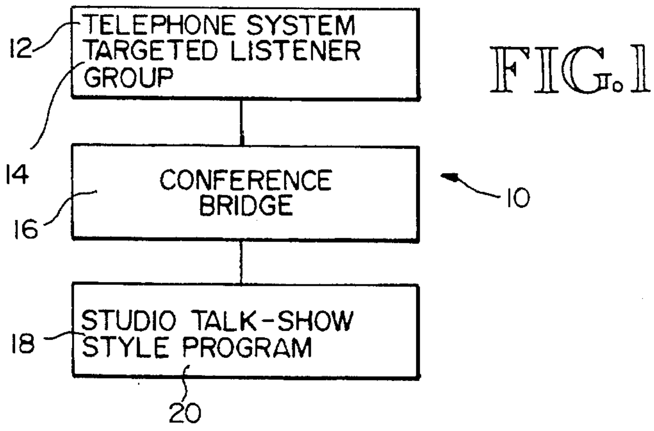
FIG. 1 is a block diagram showing a general layout of an interactive communications system.

Referring to FIG. 1, an interactive telecommunications system 10 includes three main elements, a telephone system 12 connects a targeted group of listeners 14 via a conference bridge 16 to a studio 18 where a live talk-show style program 20 is produced. Each of the three portions of system 10 fulfills a separate and distinct function.

Telephone system 12 includes a telephone handset 15 at each listener's location, whether that is an office, home, car, etc. Telephone system 12 is usually represented by a local utility that connects the listener's handset to the conference bridge 16 via the utility's own lines, another local utility's lines, or a long distance carrier. An 800- or 900-number is usually preferred so that the call is either free or easily identifiable as a charge call to a listener.

Conference bridge 16 may be located anywhere. Bridge 16 performs several functions. As a connector, the bridge allows each listener to either talk to an operator 22, which may be person or automated, or send signals by pressing various buttons on their telephones 15 that are translated by bridge 16. The bridge may act as a gate keeper, preventing unauthorized access to live programming or to other interactive services. While a personal identification number is adequate, any other security means could be used, e.g., a voice pattern identifier. Bridge 16 performs many other functions that are discussed in detail below.

The live, broadcast style, program is usually produced in a studio. The talk-show style program is performed by professional broadcasters. Guests on the program can be present in the studio or may be at a remote location, connected by telephone or other means. Dependant upon the specific situation, a script may have been written for use in covering specific material that a sponsor desires to disseminate to the target group of listeners. In order to allow the listening group to ask questions on the air, a listener pushes a specified key on their telephone indicating that they want to ask a question. The operator connects the listener with the program's producer who decides whether the question is pertinent. If a listener's question is selected to go on the "air" two way voice transmission is permitted and the listener can ask the question directly and the entire target group will hear it simultaneously.

Figure 2:
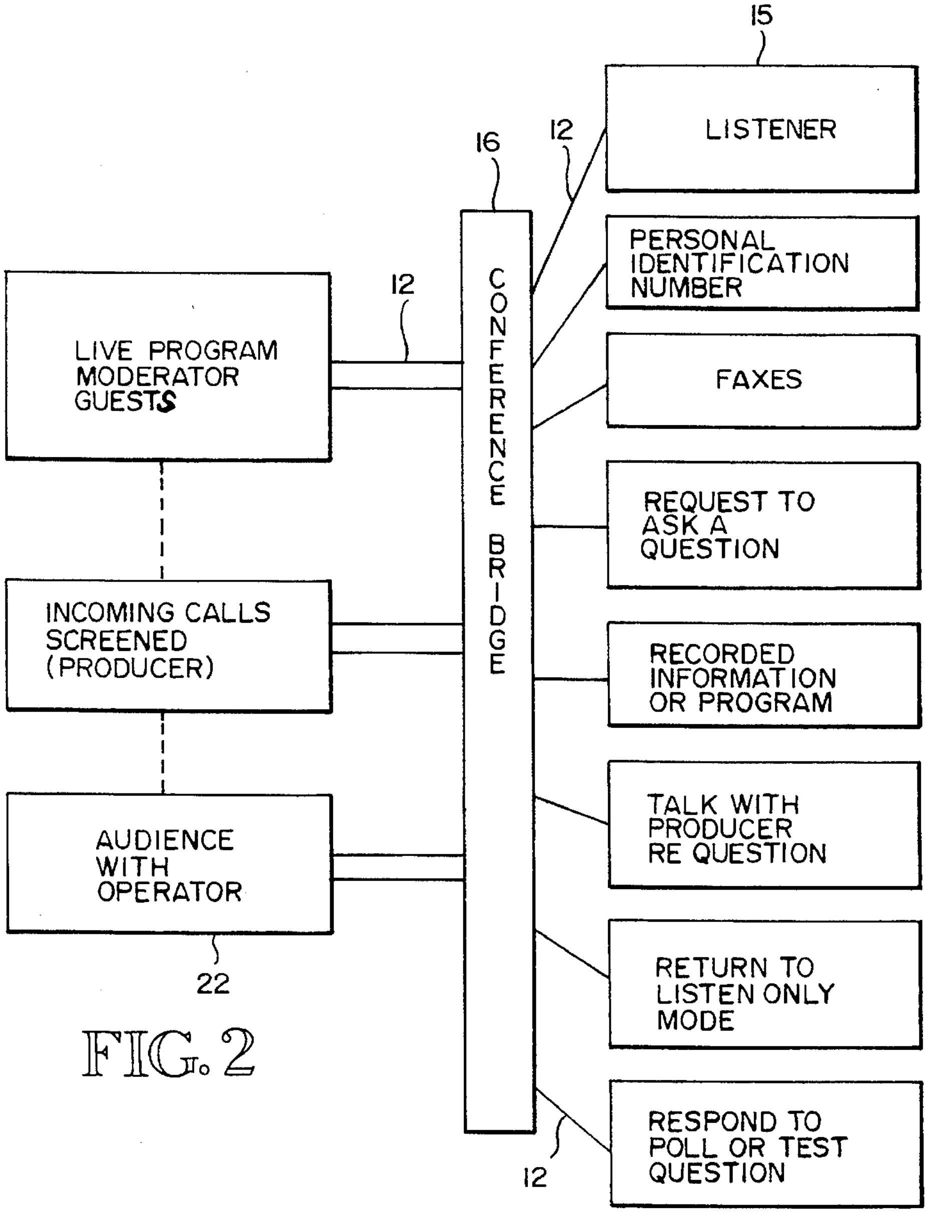
FIG. 2 is a block diagram showing examples of various modes of operation of the interactive communications system.

Shown in FIG. 2 are some of the various interactions possible between the target group of listeners and the live program, via the conference bridge. The target listening group will have been given a specific telephone number to call. The equipment currently available can handle up to 1,000 listeners, although this number is sure to increase in the near future. Each member of the listening group may also have been given a Personal Identification Number (PIN) that the conference bridge operator will ask for in order to obtain access to the program. The operator can be either a person or an automated system. Once connected by the bridge operator to the listen only line, the listener hears the program being presented. The program can be live or pre-recorded, such that if a listener misses (or wants to repeat) a live program, that program is available twenty-four hours a day. Listeners can also respond to questions presented during the program. The questions may be for taking a poll or for testing when the program is for educational credits.

The talk show format usually consists of music with announcer introductions and closings, a mixture of live and pre-recorded segments, brief segments on a narrowly defined subjects, with the exact program length being dependant upon the material that is to be presented in each session. If a program is specified to start at a particular time, listeners who call early may hear music or other programming until their program starts.

During the program a listener can indicate that they have a question or comment by pressing a predetermined button on their telephone. The signal is received by bridge 16 and the listener is connected to a producer. The producer is not "live" and therefor can converse with the listener without anyone else hearing the conversation. If the producer decides that the proposed question or comment is acceptable, the producer directs the call to the "live" program or into a queue of calls that are placed in a priority group by the producer. If a queuing system is used, the producer can change the order of questions at any time. Once the listener's question has been asked, the listener is then disconnected from two-way conversation and is again only able to listen.

Figure 3:
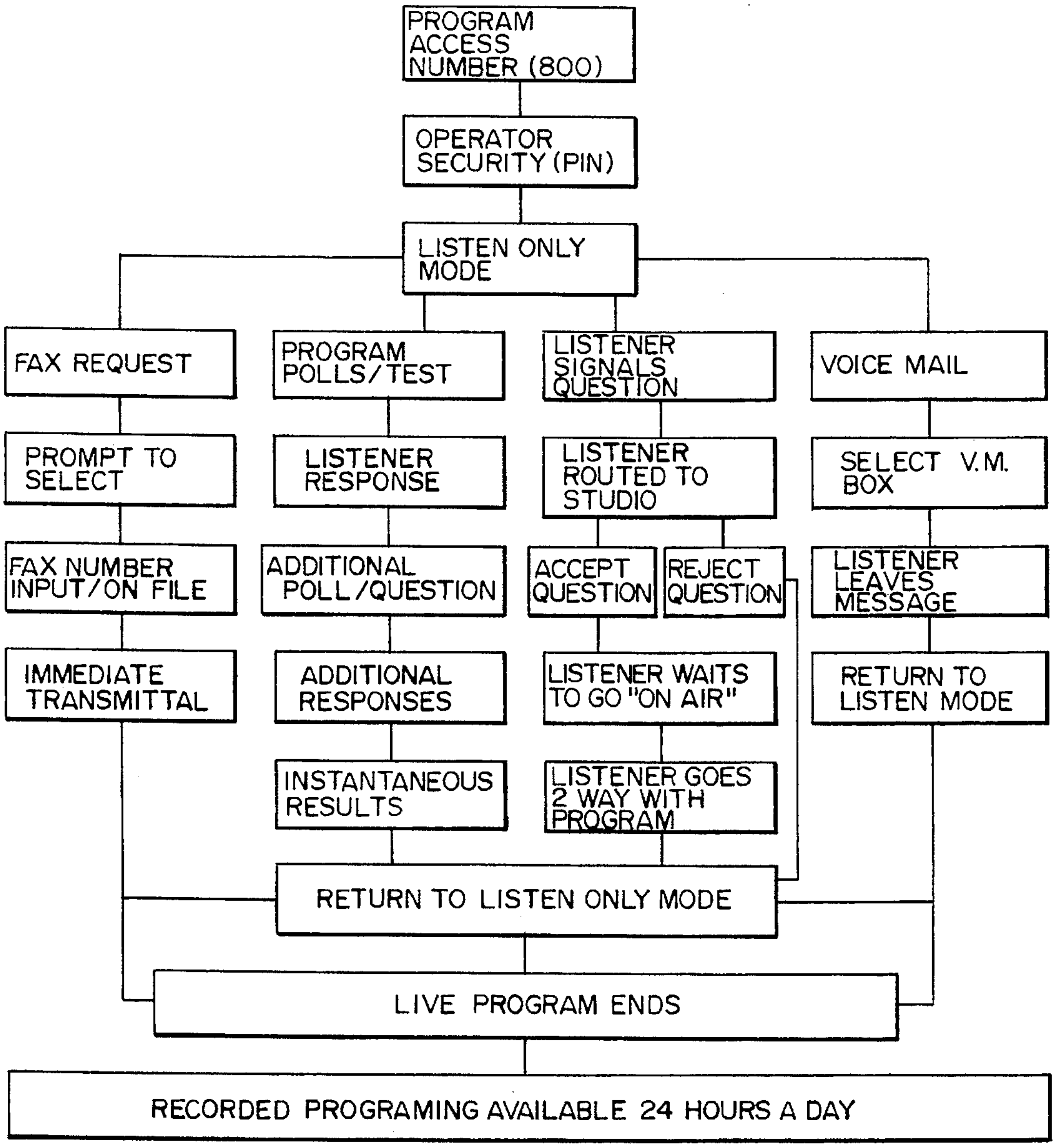
FIG. 3 is a block diagram showing functional relationships of interactive relationships between various elements of the system.

There is a myriad of other inactive functions that are possible with this system. Referring to FIG. 3, a block diagram indicates some of the interactions in the present system that are currently available. A few examples are discussed more fully bellow. If there are forms that the target group may need, as discussed during the program, the listeners can press a predetermined button on their telephone and a fax will be sent to their fax number. The listener's fax number can either be entered at the time of request or may be information contained in their data file which was identified by their PIN. An array of different documents could be in the fax file. In this case the listener would choose the desired documents and key in the appropriate identifier. Another feature of the system is instant polling of the listening group. A question (yes or no) can be presented during the program and the listeners respond by keying in one of the predetermined buttons on their telephones to answer either yes or no. The results, almost instantaneous, can be presented on the program or used to determine what information the listeners are most interested in. Voice messaging can also be used. A listener can leave a message for one of the speakers or leave an order for a product being promoted.

The equipment needed is presently available from several sources. While it is believed that any communications engineer is capable of selecting appropriate equipment. Service bureaus, such as Scherers Communications, Inc., 575 Scherers Court, Worthington, Ohio, can provide the necessary telecommunications support services.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents which are intended to define the scope of the invention.

I claim:

1. A method of interactive communications comprising the steps of:

connecting a listener's telephone to a conference bridge via a telephone system when a predetermined number is entered on said telephone;

connecting said conference bridge to a live program, having a format of a radio talk show type program, including a professional host and qualified guests who may themselves be located at remote sites, allowing said listener's telephone to receive voice communication from said program while blocking listener's voice from other listener's of said program, whereby a plurality of listener's can listen to said program but cannot interrupt it at random.

2. The method of claim 1, including the step of tabulating information such as the number of listeners and the time that they called, without any signal from said listener.

3. The method of claim 1, including the step of entering a personal identification number before said conference bridge will connect a listener to the program.

4. The method of claim 3, including the step of tabulating information about each listener based upon that listener's personal identification number, such as keeping track of how many times a listener calls, what kinds of responses are entered, in order to provide a report yielding valuable information to a sponsor of a program, such information already known by reference to the personal identification number.

5. The method of claim 1, including the step of signaling an operator by pressing a predetermined button on a listener's telephone indicating the listener desires to ask a question, connecting the requesting listener with a producer who determines whether or not to present the question on the program, and connecting said listener with the program for presentation of the question to all of the listeners.

* * * * *